Patented Mar. 24, 1931

1,797,243

UNITED STATES PATENT OFFICE

WALDO L. SEMON, OF CUYAHOGA FALLS, AND RICHARD A. CRAWFORD, OF AKRON, OHIO, ASSIGNORS TO THE B. F. GOODRICH COMPANY, OF NEW YORK, N. Y., A CORPORATION OF NEW YORK

RUBBER DISPERSION AND METHOD OF MAKING SAME

No Drawing. Application filed August 11, 1927. Serial No. 212,358.

This invention relates to dispersions of rubber in an aqueous medium and particularly to dispersions which shall have good surface tack and improved wetting properties for spreading and cementing purposes, and which at the same time shall have the very desirable property of drying quicker than ordinary aqueous dispersions of rubber. An object of the invention is therefore to provide an aqueous dispersion of rubber having the above described characteristics and further to provide a method of preparing such dispersions.

The present invention is based upon the discovery that aqueous dispersions of crude rubber having physical properties superior in the respects hereinabove indicated may be prepared by intimately admixing with rubber 10 to 100% of its weight of a rubber softener and thereafter dispersing the softened rubber batch in water containing a peptizing agent in the presence of but a relatively small amount of an organic protective colloid. We are aware of the processes of making rubber dispersions heretofore employed, and have found that the products of the present application are superior in respect to properties which are critical in determining suitability for the building operations employed in the manufacture of rubber goods.

Dispersions prepared in the manner hereinabove described when employed in place of rubber cements prepared by the solution of masticated rubber in an organic solvent are not only superior to the aqueous dispersions heretofore available but are also superior to the best grades of rubber cement in that they spread more readily and uniformly in thin, strongly coherent films which have a high degree of surface tack and, as compared with ordinary water dispersions of rubber, dry more quickly. They also give stronger adhesions to the parts with which they are associated than do other water dispersions, and where used in the manufacture of laminated products give to the constituent parts not only superior building tack but also impart a stronger union to the constituent parts after vulcanization in the finished product.

As a specific example of one embodiment of this invention, take 100 parts by weight of rubber and break it down upon a mill adding thereto during this operation 50 parts of a rubber softener, such as benzol and two parts of a protective colloid, as for example one part each of glue and casein. The masticated and softened rubber batch is then placed in an internal mixer and water containing a small proportion of a peptizing agent, such as 2% of potassium oleate, is gradually added to the rubber batch with stirring until the rubber is embodied in the internal phase of the dispersion. The resulting product which is a somewhat viscous mass may be diluted with water in any proportion to form a dispersion of desired consistency.

The above example may be varied quite widely as to proportions of ingredients employed and as to the specific softeners, peptizing agents and protective colloids employed. Our experience has shown that such softeners as oils, fats, waxes and tars, of the type commonly employed as softeners in rubber compounds, and particularly coal tar, wood tar, petroleum distillates and residues, vegetable oils and waxes, bitumens, and the like. Peptizing agents of various kinds may also be added to the water used for the dispersing of the rubber but I find that soaps of the higher fatty acids, such as potassium stearate, sodium stearate, sodium oleate, diethylamine oleate, ammonium oleate, and commercial soaps, such as castile soap, Palmolive soap and Ivory soap, are especially suitable. Protective colloids in general are operative, glue, gum arabic, casein, agaragar, Irish moss and gum tragacanth have been found to be particularly satisfactory.

An important characteristic of the method herein described is that it may be carried out in regular factory production to produce a dispersion stable in factory operations with a very small amount of the protective colloid, as for example 2 to 5 percent of any of the organic colloids herein mentioned. This is particularly important where the aqueous rubber dispersion is to be used in place of rubber cements since even moderately large portions of protective colloid destroy the adhesive properties of the dispersion.

It should further be noted that the dispersions of the present application are entirely different from liquid emulsions of rubber cements which are made by emulsifying in water a rubber cement made by dissolving 10 to 25 parts of crude rubber in 100 parts of an organic solvent, the former being a dispersion of a solid within a liquid and the latter the emulsion of two liquids. This difference in physical characteristics apparently accounts for the superior adhesive properties which the rubber dispersions of this application possess over the emulsified cements, and this same degree of superiority persists even where the volatile organic solvents are removed as well as may be possible from the emulsified rubber cement.

It is to be understood that the term rubber as herein employed is intended to include crude, vulcanized and reclaimed rubber or rubber-like substances, such as balata, gutta percha, or other natural or artificial solid rubber isomers, either admixed with compounding ingredients and vulcanizing agents or not.

It is obvious that numerous modifications and variations in the process hereinabove described may be made without departing from the principles of this invention, and we therefore do not wholly limit the scope of the claims herein to the specific process or to the specific ingredients hereinabove mentioned.

We claim:

1. The herein described method of making a dispersion of rubber which comprises adding to 100 parts by weight of rubber 10 to 100 parts of benzol, one part of glue and one part of casein, thoroughly masticating the batch and during mastication adding slowly thereto a water solution of potassium oleate until the rubber constitutes the dispersed phase of the batch.

2. The herein described method of making a dispersion of rubber which comprises adding a minor proportion of a volatile rubber softener to a mass of rubber, thoroughly masticating the rubber and adding thereto during mastication small proportions of glue and casein, and thereafter admixing with the rubber batch a water solution of an alkali soap of a higher fatty acid until the rubber constitutes the dispersed phase of the batch.

In witness whereof we have hereunto set our hands this 3rd day of August, 1927.

WALDO L. SEMON.
RICHARD A. CRAWFORD.